United States Patent
Seol et al.

(10) Patent No.: US 9,923,848 B2
(45) Date of Patent: Mar. 20, 2018

(54) ELECTRONIC DEVICE AND METHOD OF PROCESSING MESSAGE IN ELECTRONIC DEVICE

(71) Applicant: Samsung Electronics Co., Ltd., Gyeonggi-do (KR)

(72) Inventors: Kee-Hwan Seol, Gyeonggi-do (KR); Bhanu Prakash Anche, Bangalore (IN); Yong-Seok Park, Gyeonggi-do (KR); Sung-Hyuk Lee, Gyeonggi-do (KR); Jin-Kyu Lee, Gyeonggi-do (KR); Hyo-Jin Jung, Gyeonggi-do (KR); Sang-Ho Chae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 283 days.

(21) Appl. No.: 14/638,414

(22) Filed: Mar. 4, 2015

(65) Prior Publication Data

US 2015/0312178 A1  Oct. 29, 2015

(30) Foreign Application Priority Data

Apr. 29, 2014  (KR) .................. 10-2014-0051663

(51) Int. Cl.
*G06F 15/16*  (2006.01)
*H04L 12/58*  (2006.01)

(52) U.S. Cl.
CPC .......... *H04L 51/046* (2013.01); *H04L 51/066* (2013.01); *H04L 51/22* (2013.01); *H04L 51/36* (2013.01)

(58) Field of Classification Search
CPC ..................................... H04L 51/04
USPC ....................................... 709/206
See application file for complete search history.

(56) References Cited

U.S. PATENT DOCUMENTS

| 8,565,149 | B2* | 10/2013 | Katis ................ H04L 12/1831 370/328 |
| 2010/0167766 | A1 | 7/2010 | Duarte et al. |
| 2012/0072856 | A1* | 3/2012 | Park .................. H04L 12/5815 715/752 |
| 2013/0204888 | A1 | 8/2013 | Guzman Suarez et al. |

(Continued)

FOREIGN PATENT DOCUMENTS

| EP | 2 224 653 | 9/2010 |
| KR | 1020130141638 | 12/2013 |

OTHER PUBLICATIONS

European Search Report dated Sep. 30, 2015 issued in counterpart application No. 15165586.7-1862, 7 pages.

*Primary Examiner* — Frantz Jean
(74) *Attorney, Agent, or Firm* — The Farrell Law Firm, P.C.

(57) ABSTRACT

Methods and apparatus are provided for processing a message in an electronic device. A first message application is executed, which displays a first message and a second message in a combined message display window of an interlocutor. A second message application is executed, which provides the second message to the first message application while the first message application is executed. The first message is received and/or transmitted through the first message application, and the second message is received and/or transmitted through the second message application. The first message application and the second message application have different message reception and transmission techniques.

29 Claims, 17 Drawing Sheets

(56) References Cited

U.S. PATENT DOCUMENTS

2013/0297712 A1    11/2013  Park
2016/0380928 A1*  12/2016  Park ........................ H04L 51/32
                                                                              709/206

* cited by examiner

ELECTRONIC DEVICE AND METHOD OF PROCESSING MESSAGE IN ELECTRONIC DEVICE

PRIORITY

This application claims priority under 35 U.S.C. §119(a) to Korean Application Serial No. 10-2014-0051663, which was filed in the Korean Intellectual Property Office on Apr. 29, 2014, the content of which is incorporated herein by reference.

BACKGROUND OF THE INVENTION

1. Field of the Invention

The present invention relates generally to an electronic device and a method of processing a message, and more particularly, to an electronic device and a method of transmitting a message to and receiving a message from the same interlocutor by using a plurality of message processing manners.

2. Description of the Related Art

A message application generally supports only one message type. When an electronic device supports a plurality of message reception and transmission techniques, a chat room may be formed according to a message technique supported by each of the message applications.

When a plurality of contact media with respect to the same interlocutor are stored in the electronic device, a plurality of chat rooms are formed according to the plurality of contact media, despite the fact that they have the same interlocutor.

For example, when address information and a plurality of telephone numbers are stored in the electronic device for a specific buddy, and the same buddy is the same user simultaneously using an Instant Message (IM) application and a Short Message Service/Multimedia Messaging Service (SMS/MMS) application, a chat room of the IM application may be generated according to the address information and a plurality of chat rooms of the SMS/MMS application may be generated according to the plurality of telephone numbers. When a plurality of chat rooms are generated, although the chat rooms are logically for the same interlocutor, a context and a consistency of a conversation are individually managed in each of the chat rooms according to a message manner or a contact medium, and thus it is difficult to grasp context.

In addition, in order to grasp the whole context of a conversation with the same interlocutor, each of the plurality of chat rooms should be checked.

SUMMARY OF THE INVENTION

The present invention has been made to address at least the above problems and/or disadvantages and to provide at least the advantages described below. Accordingly, an aspect of the present invention provides an electronic device and a method of processing a message of an electronic device capable of receiving a message from and transmitting a message to the same interlocutor by using a plurality of message processing manners.

According to one aspect of the present invention, an electronic device is provided that includes a memory and a processor coupled to the memory. The processor is configured to execute a first message application, which displays a first message and a second message in a combined message display window of an interlocutor. The processor is further configured to execute a second message application, which provides the second message to the first message application while the first message application is executed. The first message is received and/or transmitted through the first message application, and the second message is received and/or transmitted through the second message application. The first message application and the second message application have different message reception and transmission techniques.

According to another aspect of the present invention, a method is provided for processing a message in an electronic device. A first message and a second message are displayed in a combined message display window of an interlocutor, via execution of a first message application. The second message is provided to the first message application while the first message application is executed, via execution of a second message application. The first message is received and/or transmitted through the first message application, and the second message is received and/or transmitted through the second message application. The first message application and the second message application have different message reception and transmission techniques According to an additional aspect of the present invention, an article of manufacture is provided for processing a message in an electronic device, which includes a machine readable medium containing one or more programs which when executed implement the steps of: displaying a first message and a second message in a combined message display window of an interlocutor, via a first message application; and providing the second message to the first message application while the first message application is executed, via a second message application. The first message is received and/or transmitted through the first message application, and the second message is received and/or transmitted through the second message application. The first message application and the second message application have different message reception and transmission techniques.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
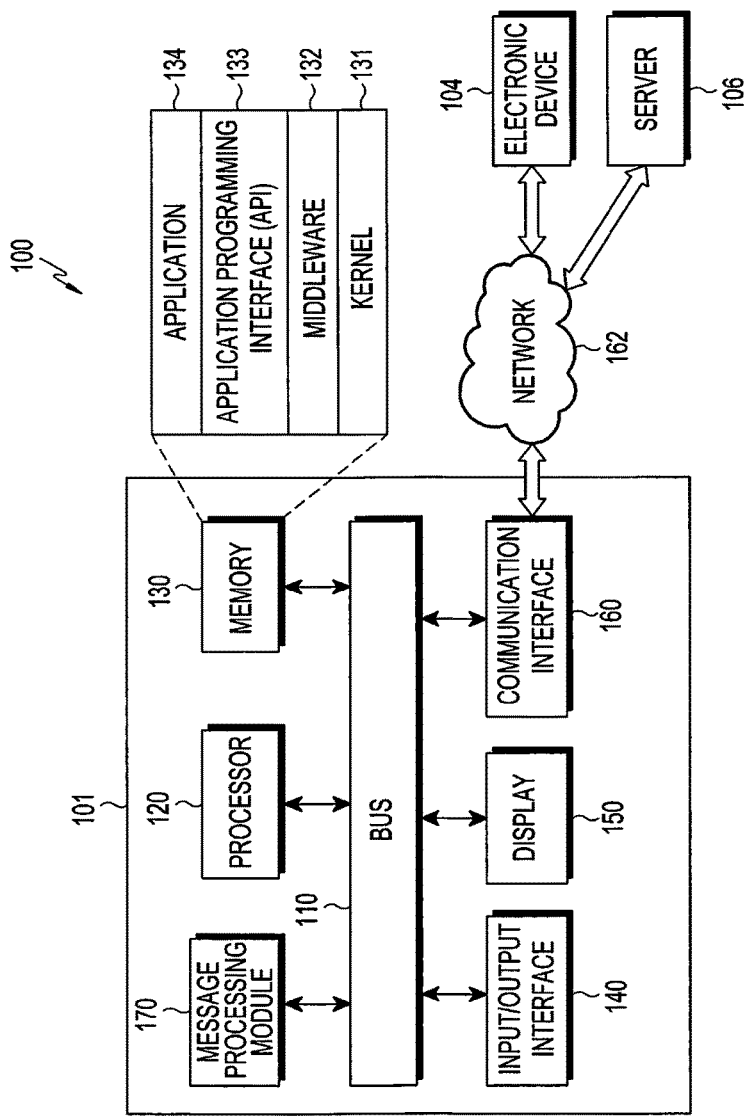
FIG. 1 is a diagram illustrating a network environment including an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, the terms "include" or "may include", which may be used in various embodiments of the present invention, refer to the presence of functions, operations, or elements, and do not restrict the inclusion of additional functions, operations, or elements. Further, as used in various embodiments of the present invention, the terms "include", "have", and their conjugates may be construed to denote a certain characteristic, number, step, operation, constituent element, component, or a combination thereof, but may not be construed to exclude the existence of or a possibility of additional characteristics, numbers, steps, operations, constituent elements, components, or combinations thereof.

The term "or" used in various embodiments of the present invention includes any or all of combinations of listed words. For example, the expression "A or B" may include A, B, or both A and B.

The expression "1", "2", "first", or "second" used in various embodiments of the present invention may modify various components of various embodiments but does not limit the corresponding components. For example, the above expressions do not limit the sequence and/or importance of the corresponding constituent elements. The expressions may be used to distinguish a component element from another component element. For example, a first user device and a second user device indicate different user devices although both of them are user devices. Additionally, without departing from the scope of the present invention, a first component element may be named a second component element. Similarly, the second component element also may be named the first component element.

It should be noted that if it is described that one component element is "coupled" or "connected" to another component element, the first component element may be directly coupled or connected to the second component element, and a third component element may be "coupled" or "connected" between the first and second component elements. Conversely, when one component element is "directly coupled" or "directly connected" to another component element, it may be construed that a third component element does not exist between the first component element and the second component element.

The terms used in various embodiments of the present invention are merely used to describe a certain embodiment and should not limit various embodiments of the present invention. As used herein, the singular forms are intended to include the plural forms as well, unless the context clearly indicates otherwise.

Unless defined differently, all terms used herein, which include technical terminologies or scientific terminologies, have the same meaning as those recognized by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined herein.

An electronic device according to an embodiment of the present invention may be a device that includes a biometric function. For example, the electronic device may be embodied as at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device {e.g., a head-mounted-device (HMD) such as electronic glasses}, electronic clothes, an electronic bracelet, an electronic necklace, an electronic appcessory, an electronic tattoo, or a smart watch.

According to an embodiment of the present invention, an electronic device may be embodied as a smart home appliance with a communication function. The smart home appliance may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box, a game console, an electronic dictionary, an electronic key, a camcorder, and an electronic picture frame.

According to an embodiment of the present invention, an electronic device may be embodied as a medical device (for example, a magnetic resonance angiography (MRA) scanner, a magnetic resonance imaging (MRI) scanner, a computed tomography (CT) scanner, a scanner, an ultrasonograph, or the like), a navigation device, a Global Positioning System (GPS) receiver, an Event Data Recorder (EDR), a Flight Data Recorder (FDR), a vehicle infotainment device, electronic equipment for ship (for example, a ship navigation device and gyro-compass and the like), avionics, a security device, a head unit for vehicle, an industrial or household robot, an Automatic Teller Machine (ATM) in banking facilities, or a Point Of Sales (POS) in stores.

According to another embodiment of the present invention, the electronic device may be embodied as furniture, a part of a building/structure having a communication function, an electronic board, an electronic signature receiving device, a projector, or various measuring equipment (e.g., equipment for a water supply, electricity, gas, or radio waves). An electronic device, according to an embodiment of the present invention, may be a combination of one or more of above described devices. Also, an electronic device, according to an embodiment of the present invention, may be a flexible device. Also, an electronic device, according to an embodiment of the present invention, is not limited to the above described devices.

Hereinafter, an electronic device, according to an embodiment of the present invention, is described with reference to the accompanying drawings. The term "user" may refer to a person who uses an electronic device or a device (for example, an artificial intelligence electronic device) that uses an electronic device.

FIG. 1 is a diagram illustrating a network environment 100 including an electronic device 101, according to an embodiment of the present invention. Referring to FIG. 1, the electronic device 101 includes a bus 110, a processor 120, a memory 130, an input/output interface 140, a display 150, a communication interface 160, and a message processing module 170.

The bus 110 is a circuit connecting the aforementioned elements and transmitting communication (e.g., a control message) between the aforementioned elements.

For example, the processor 120 receives instructions from the aforementioned other elements (e.g., the memory 130, the input/output interface 140, the display 150, the communication interface 160, and the message processing module 170) through the bus 110, deciphers the received instructions, and performs calculation or data processing according to the deciphered instructions.

According to an embodiment of the present invention, the processor 120 controls the message processing module 170 to execute a plurality of message applications included in the message processing module 170. The processor 120 executes a first message application so as to display, in a combined message display window of an interlocutor, a first message and a second message that are received and/or transmitted through the first message application and a second message application, respectively, which have different message reception and transmission techniques. In addition, while the first message application is executed, the processor 120 executes a second message application so as to provide the second message to the first message application.

The memory 130 stores instructions or data received from or created by the processor 120 or other elements (e.g., the input/output interface 140, the display 150, the communication interface 160, and the message processing module 170). The memory 130 includes programming modules, for example, a kernel 131, a middleware 133, an Application Programming Interface (API) 134, and applications 134. Each of the programming modules described above may be configured by software, firmware, hardware, or combinations of two or more thereof.

The kernel 131 controls or manages system resources (e.g., the bus 110, the processor 120, or the memory 130) used for executing an operation or a function implemented in the other remaining programming modules, for example, the middleware 132, the API 133, or the applications 134. The kernel 131 also provides an interface capable of accessing and controlling or managing the individual elements of the electronic device 101 by using the middleware 132, the API 133, or the applications 134.

The middleware 132 performs a relay function of allowing the API 133 or the applications 134 to exchange data by communicating with the kernel 131. Furthermore, in regard to task requests received from the applications 134, the middleware 132 performs a control (e.g., a scheduling or a load balancing) for the task requests using, for example, a method of assigning a priority for using the system resources (e.g., the bus 110, the processor 120, and the memory 130) of the electronic device 101 to at least one of the applications 134.

The API 133 is an interface through which the applications 134 may control functions provided by the kernel 131 or the middleware 132, and includes at least one interface or function (e.g., an instruction) for file control, window control, image processing, or text control.

The applications 134 may include an SMS/MMS application, an Instant Message (IM) application, an e-mail application, a calendar application, an alarm application, a health care application, an environmental information application, etc. Additionally or alternately, the applications 134 may be related to an information exchange between the electronic device 101 and an external electronic device (e.g., an electronic device 104). The application related to the information exchange may include, for example, a notification relay application for transferring specific information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, and the like). Additionally or alternatively, the notification relay application may receive the notification information from, for example, the external electronic device (e.g., the electronic device 104), and may provide the received notification information to a user. The device management application may manage (e.g., install, delete, or update), for example, a function (e.g., turning on/off the external electronic device itself (or some elements thereof) or adjusting brightness (or resolution) of a display) for at least a part of the external electronic device (e.g., the electronic device 104) communicating with the electronic device 101, applications operating in the external electronic device, or services (e.g., a telephone call service or a message service) provided from the external electronic device.

The applications 134 may include an application designated according to a property (e.g., a kind of the electronic device) of the external electronic device (e.g., the electronic device 104). For example, when the external electronic device is an MP3 player, the applications 134 may include an application related to reproduction of music. According to an embodiment of the present invention, the applications 134 may include at least one of an application designated to the electronic device 101 and an application received from the external electronic device (e.g., a server 106 or the electronic device 104).

The input/output interface 140 transfers an instruction or data input from a user through an input/output device (e.g., a sensor, a keyboard, a communication module (e.g., a BT module and a WiFi module) or a touch screen) to the processor 120, the memory 130, the communication interface 160, or the message processing module 170 through, for example, the bus 110. Furthermore, the input/output interface 140 may output instructions or data received from the processor 120, the memory 130, the communication interface 160, or the message processing module 170 through, for example, the bus 110. Here, the input/output interface 140 may output the instructions and data through the input/output device (e.g., a speaker or a display).

The display 150 displays various pieces of information (e.g., multimedia data or text data) to a user.

The communication interface 160 communicatively connects the electronic device 101 and the external electronic device (e.g., the electronic device 104 or the server 106). For example, the communication interface 160 is connected to a network 162 through a wireless communication or a wired communication to communicate with the external device. The wireless communication may include at least one of, for example, Wi-Fi, a Bluetooth (BT), Near Field Communication (NFC), a Global Positioning System (GPS), and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), or the like). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present invention, the network 162 may be embodied as a telecommunication network. The communication networks may include at least one of a computer network, the Internet, or a telephone network. According to an embodiment, a protocol (e.g., a transport layer protocol, a data link layer protocol, or a physical layer protocol) for communication between the electronic device 101 and the external device may be supported by at least one of the applications 134, the API 133, the middleware 132, the kernel 131, and the communication interface 160.

According to an embodiment of the present invention, the message processing module 170 may be functionally connected to another element (e.g., the processor 120, the memory 130, the input/output interface 140, the communication interface 160, or the like) to obtain a status (e.g., an attached or detached status of the electronic device to the user) of the electronic device. In addition, the message processing module 170 may independently control a plurality of input/output devices (e.g., a sensor, a touch panel, a microphone, a speaker, a display, or the like) through, for example, the input/output interface 140, based on the status of the electronic device. The message processing module 170 is described in greater detail below with reference to FIGS. 2 to 13.

Figure 2:
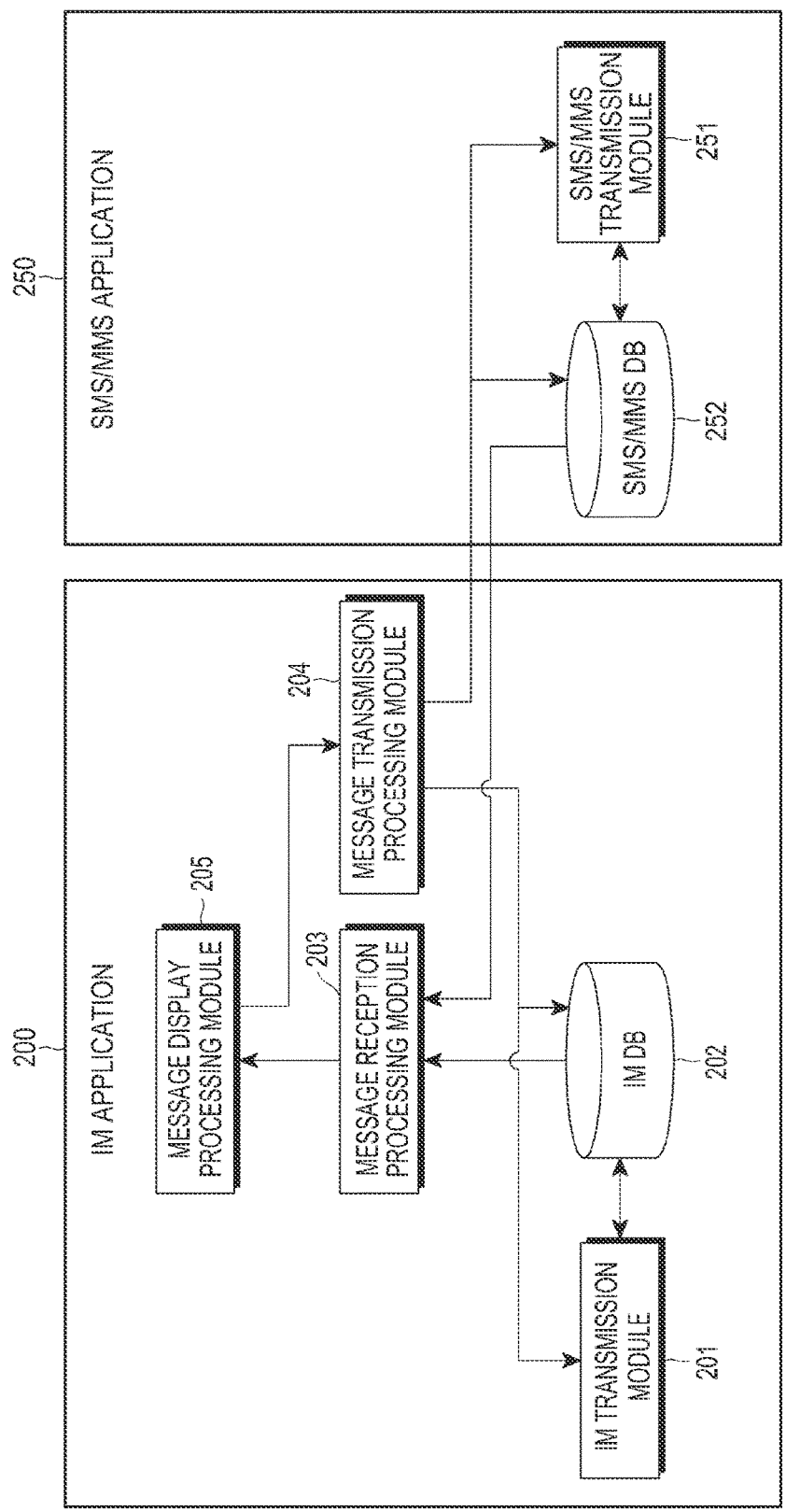
FIG. 2 is a block diagram illustrating a message application unit of the electronic device, according to an embodiment of the present invention.

FIG. 2 is a diagram illustrating a block diagram of the message processing module 170 in the electronic device (e.g., the electronic device 101), according to an embodiment of the present invention. The message processing module 170 includes at least one message application among various application modules included in the applications 134. For example, the message processing module 170 may separately include an SMS/MMS application, an IM application, an email application, and the like.

According to an embodiment of the present invention, the message processing module 170 includes a first message application and the second message application, which have different message reception and transmission techniques. The first message application is exemplified as the IM application, and the second message application is exemplified as the SMS/MMS application. However, the first message application and the second message application are not limited to the IM application and the SMS/MMS application, respectively. Referring to FIG. 2, the message processing module 170 includes the IM application 200 and the SMS/MMS application 250.

When the IM application is executed, the IM application 200 displays, in a combined message display window of a selected interlocutor, an Instant Messaging (IM) message received and/or transmitted through the IM application and an SMS/MMS message provided from the SMS/MMS application 250, which has a reception and transmission technique that differs from that of the IM application 200.

The IM application 200 detects the IM received and/or transmitted with first contact information among a plurality of contact information of the interlocutor, receives a second message received and/or transmitted with second contact information among the plurality of contact information of the interlocutor using the SMS/MMS application, and displays the first message and the second message in the combined message display window of the interlocutor according to a received and transmitted time sequence. The IM application 200 includes an IM transmit module 201, an IM DB 202, a message reception processing module 203, a message transmission processing module 204, and a message display processing module 205.

The IM transmit module 201 receives and/or transmits the IM using address information of the interlocutor.

The IM DB 202 stores a plurality of interlocutors, and a plurality of contact information, including at least one of first contact information for receiving and/or transmitting the IM and second contact information for receiving and/or transmitting the SMS/MMS message for each of the plurality of interlocutors. In an embodiment of the present invention, the plurality of contact information includes at least one of address information, at least one telephone number, and an email address. The first contact information for receiving and/or transmitting the IM may be exemplified as the address information, and the second contact information for receiving and/or transmitting the SMS/MMS message may be exemplified as the at least one telephone number. The IM DM 202 also stores the received and/or transmitted IM.

While the IM application is executed, when an interlocutor selected among the plurality of interlocutors has the plurality of contact information, the message reception processing module 203 displays the combined message display window (e.g., a chat room). The message reception processing module 203 requests and receives the IM, which is previously received and/or transmitted with the address information of the interlocutor, among the IM stored in the IM DB 202. The message reception processing module 203 also requests the SMS/MMS message previously received and/or transmitted with the at least one telephone number of the interlocutor from an SMS/MMS DB 252 of the SMS/MMS application 250. The message reception processing module 203 combines the previously received and/or transmitted IM e and the previously received and/or transmitted SMS/MMS message, arranges the previously received and/or transmitted IM and the previously received and/or transmitted SMS/MMS message according to a received and transmitted time sequence, and displays the arranged IM and SMS/MMS message in the combined message display window through the message display processing module 205. When the plurality of contact information are included in the contact information of the interlocutor, the message reception processing module 203 displays a type of each of a plurality of message reception and transmission techniques in the display 150, and displays a message reception and transmission technique selected for the combined message display window of the interlocutor. When a message display window list viewing is selected while the IM application is executed, the message reception processing module 203 arranges and displays a message display window list including at least one of a general message display window and a combined message display window, according to a message reception and transmission time sequence. The message reception processing module 203 may distinguish the general message display window and the combined message display window. The general message display window includes the address information for receiving and/or transmitting the IM to the contact information of the interlocutor. The combined message display window includes the address information for receiving and/or transmitting the IM to the contact information of the interlocutor and at least one telephone number for receiving and/or transmitting the SMS/MMS message.

The message reception processing module 203 may separately distinguish a first combined message display window and a second combined message display window of the combined message display window. The first combined message display window displays the last received and/or transmitted IM, and the second combined message display window displays the last received and/or transmitted SMS/MMS message.

When the combined message display window is selected from the message display window list, the message reception processing module 203 identifies multiple pieces of contact information of interlocutors corresponding to the selected combined message display window to receive a previous IM received and/or transmitted with the address information from the IM DB 202 and to receive a previous SMS/MMS message received and/or transmitted with at least one telephone number from the SMS/MMS DB 252 of the SMS/MMS application 250. Also, the message reception processing module 203 combines, arranges, and displays the IM and the SMS/MMS messages on the combined message display window of the interlocutor. A logic for arranging the IM and the SMS/MMS messages may have various configurations, such as, for example, a time sequence, an inverse of time, or the like.

The message reception processing module 203 continuously monitors the SMS/MMS DB 252 while the IM application is executed. Therefore, when a new SMS/MMS message is received through an SMS/MMS transmission module 251 of the SMS/MMS application 250 and stored in the SMS/MMS DB 252 while the message reception processing module 203 displays the message display window list, the message reception processing module 203 receives the newly received SMS/MMS message by requesting the newly received SMS/MMS message from the SMS/MMS DB 252. In addition, the message reception processing module 203 may change a position of the combined message display window, corresponding to a sender of the newly received SMS/MMS message, in the message display window list. For example, the message reception processing module 203 may shift the combined message display window so that it is displayed at the top or bottom of the message display window list, and may display the combined message display window so as to separate the newly received SMS/MMS message.

The message reception processing module 203 may display the IM or the SMS message at the combined message display window, regardless of a transmission technique of the message, while a transmission operation is performed through a transmission technique of the IM or the SMS/MMS.

When the message reception processing module 203 transmits a message written in the transmission technique of the IM while the message reception processing module 203 displays the combined message display window, and the message reception processing module 203 receives information informing that the transmission to the interlocutor is impossible, the message reception processing module 203 may inform of the impossibility of the transmission of the IM and may display a message recommending transmission using the SMS/MMS. When a deletion of a second message displayed in the combined message display window is selected, the message reception processing module 203 may delete the selected second message by submitting a request for deletion of the selected second message to the SMS/MMS DB 252.

When the second contact information of the selected interlocutor includes a plurality of telephone numbers, the message reception processing module 203 may receive and display only a predetermined default telephone number from the SMS/MMS DB 252. In addition, when a new SMS/MMS message is received while the electronic device 101 is in a standby mode, the message reception processing module 203 informs of the reception of the new SMS/MMS message through the IM application. For example, the reception processing module 203 may display an icon for informing of the reception of the new SMS/MMS message with an icon of the IM application in a standby screen, or may display the icon for informing of the reception of the new SMS/MMS message in an indication area of the standby screen in a type of the IM application. Alternatively, when the icon informing of the reception of the new SMS/MMS message is displayed in the indication area of the standby screen in a type of the SMS/MMS application, and the icon is selected, the IM application is executed and the new SMS/MMS message may be confirmed.

When the transmission technique of the IM is selected, while the combined message display window is displayed, the message transmission processing module 204 transmits the written message as an IM through the IM transmission module 201. In addition, when the transmission technique of the SMS/MMS is selected, while the combined message display window is displayed, the message transmission processing module 204 transmits the written message as an SMS/MMS message through the SMS/MMS transmission module 251.

The message display processing module 205 displays the IM received from the message reception processing module 203 in the general message display window while the IM application is executed. In addition, the message display processing module 205 displays the IM or the SMS/MMS message received from the message reception processing module 203 in the SMS/MMS combined message display window while the IM application is executed. The combined message display window may include a view group having a plurality of views. The view may include predetermined first and second view types. The first view type may be for the IM and the second view type may be for the SMS/MMS message. The second view type for the SMS/MMS message may be the same as that of the received and/or transmitted SMS/MMS message displayed in the SMS/MMS message display window of the SMS/MMS application. Therefore, when the IM is received from the message reception processing module 203 at the message display processing module 205, the message display processing module 205 may display the IM in the combined message display window as the first view type for the IM. In addition, when the SMS/MMS message is received from the message reception processing module 203 at the message display processing module 205, the message display processing module 205 may display the SMS/MMS message in the combined message display window as the first view type for the SMS/MMS. In addition, the message display processing module 205 may display information such as, for example, a plurality of buddy lists, a message display window list, types of message reception and transmission techniques, and the like in the display 150 while the IM application is executed, according to a request of the message reception processing module 203.

The message reception and transmission technique of the SMS/MMS application 250 is different from that of the IM application, which receives and transmits the message by using an internet. However, the SMS/MMS application 250 may provide the SMS/MMS to the IM application 200 while the IM application is executed. The SMS/MMS application 250 includes the SMS/MMS transmission module 251 and the SMS/MMS DB 252. The SMS/MMS transmission module 251 transmits the SMS/MMS message received by the message transmission processing module 204 while the IM application is executed. The SMS/MMS DB 252 stores the received SMS/MMS message in the SMS/MMS DB 252 while the IM application is executed. The SMS/MMS DB 252 provides the stored SMS/MMS message to the message reception processing module 203 of the IM application 200. In addition, the SMS/MMS DB 252 stores the SMS/MMS message received by the message transmission processing module 204. A module forming the first message application (i.e., the IM application 200) and a module forming the second message application (i.e. the SMS/MMS application 250), both included in the message processing module 170 of FIG. 1, may be configured in the same manner when included in the application 134.

An operation of processing the message by using the message processing module 170 shown in FIG. 1 is described in greater detail below with reference to FIGS. 3 to 13.

Figure 3:
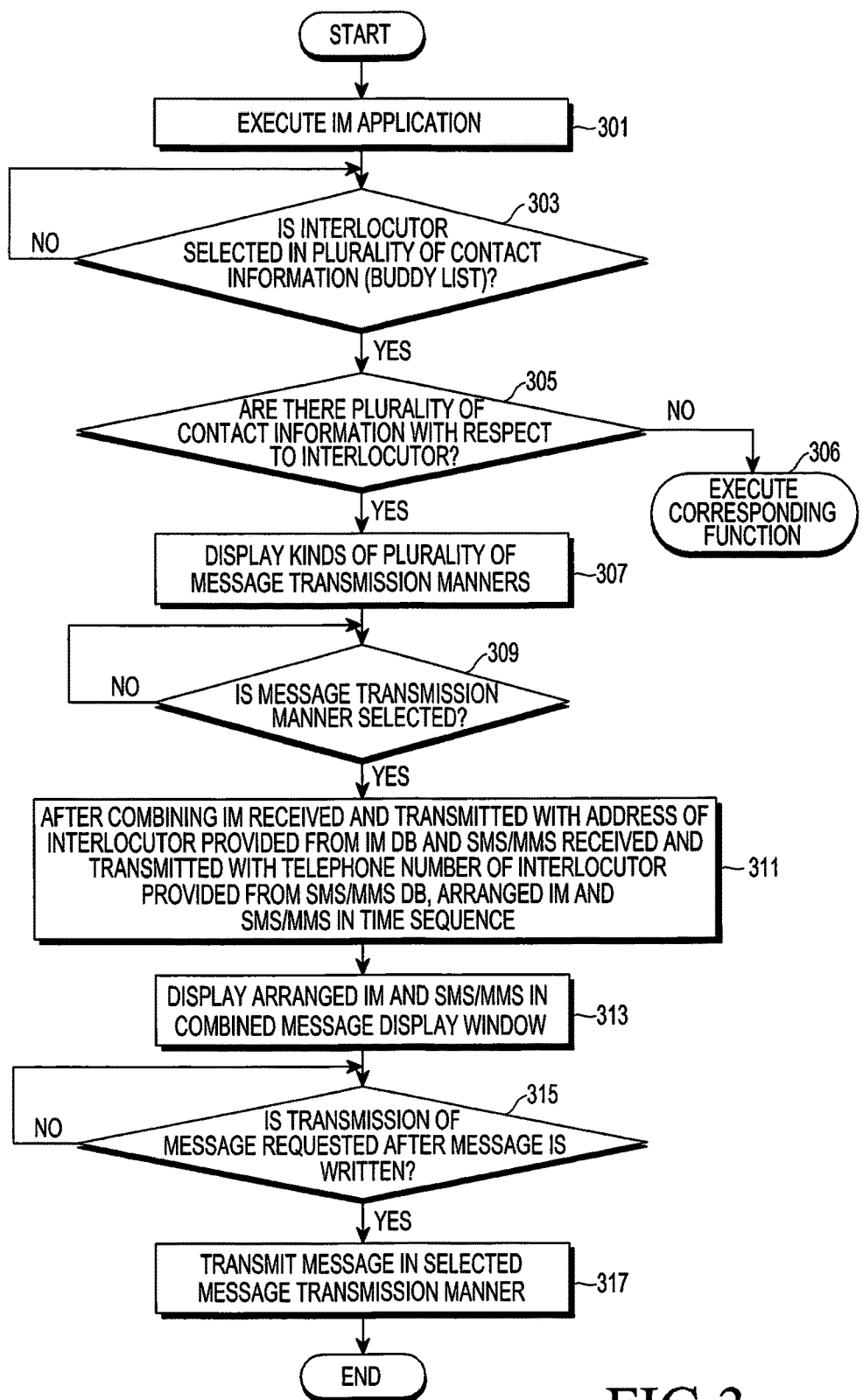
FIG. 3 is a diagram illustrating a message processing operation in an electronic device, according to an embodiment of the present invention.
Figure 4A:
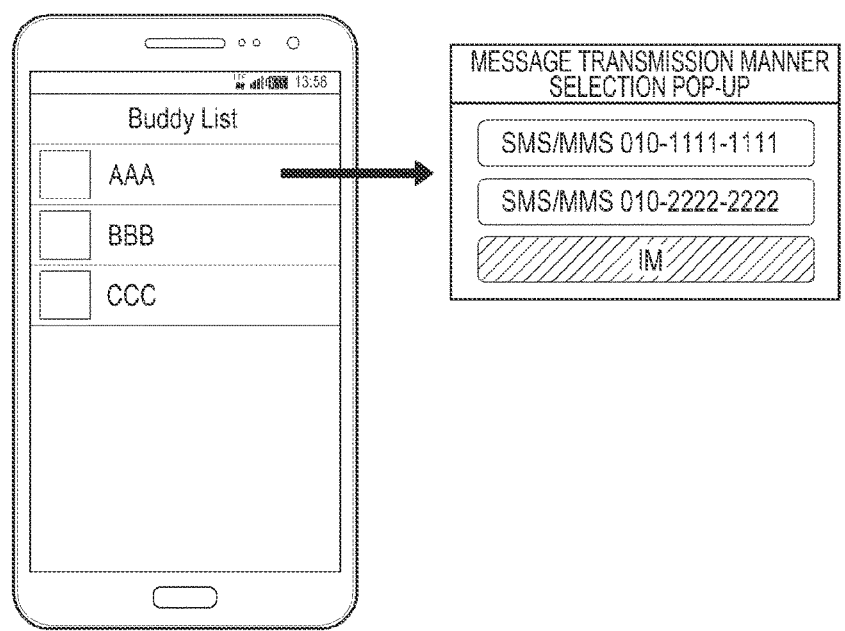
FIGS. 4A and 4B are diagrams illustrating the message processing operation in the electronic device, according to an embodiment of the present invention.
Figure 4B:
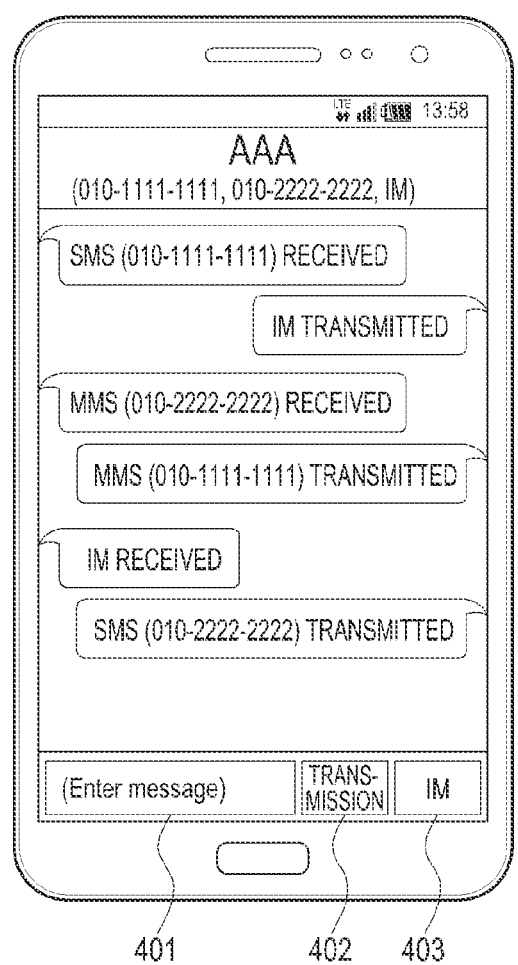

FIG. 3 is a diagram illustrating a message processing operation in an electronic device, according to an embodiment of the present disclosure. FIGS. 4A and 4B are diagrams illustrating the message processing operation in the electronic device, according to an embodiment of the present invention.

Referring to FIG. 3, the IM application is executed, in step 301. The IM application 200 determines whether an interlocutor is selected by the user from among a plurality of contact information (e.g., the buddy list), in step 303. When the interlocutor is selected by the user, the IM application determine whether there is a plurality of contact information with respect to the selected interlocutor, in step 305. When the IM application 200 determines that there is not a plurality of contact information, a corresponding function is executed, in step 306. When the IM application 200 determines that there is a plurality of contact information with respect to the selected interlocutor, the IM application 200 displays the types of message transmission techniques that correspond to the plurality of contact information, in step 307. For example, when the plurality of contact information include address information and first and second telephone numbers, the types of message reception and transmission techniques include IM using the address number, SMS/MMS using the first telephone number, and SMS/MMS using the second telephone number.

In step 309, it is determined whether a message transmission and reception technique is selected from among the types of techniques. When the message reception and transmission technique is selected, the IM application 200 displays the selected interlocutor and the combined message display window, which is already generated. Alternatively, when there is no combined message display window of the selected interlocutor, a new combined message display window is generated and displayed. The IM application 200 receives the IM previously received and/or transmitted with the address information of the interlocutor by requesting it from the IM DB 202, in step 311. In addition, the IM application 200 receives the SMS/MMS message previously received and/or transmitted with the plurality of telephone numbers of the interlocutor by requesting it from the SMS/MMS DB 252, in step 311. Further, the IM application 200 arranges the IM provided from the IM DB 202 and the SMS/MMS message provided from the SMS/MMS DB 252, according to the received and transmitted time sequence after combining the IM and the SMS/MMS, in step 311. The IM application 200 displays the arranged IM and SMS/MMS messages in the combined message display window, in step 313. The IM application 200 may separately display the IM and the SMS/MMS messages.

In step 315, it is determined whether the transmission of a message written by a user is requested. When the transmission is requested, the IM application displays the written message in the combined message display window, and simultaneously transmits the written message in the message reception and transmission technique selected in step 309, in step 317.

The operations of FIG. 3 are described below with reference to FIGS. 4A and 4B. As shown in FIG. 4A, the interlocutor AAA is selected while the IM application is executed and the plurality of contact information of a "Buddy List" is displayed by the request of the user. The IM application 200 displays a plurality of message transmission techniques, namely, SMS/MMS 010-1111-1111, SMS/MMS 010-2222-2222 and IM AAA@xxx.com, which correspond to a plurality of contact information 010-1111-1111, 010-2222-2222 and AAA@xxx.com of the interlocutor. In addition, when the transmission techniques of the IM is selected, the IM application 200 displays a combined message display window of the interlocutor AAA as shown FIG. 4B. The IM application 200 displays an IM previously received and/or transmitted with the IM address information AAA@xxx.com provided from the IM DB 202, and an SMS/MMS message previously received and/or transmitted with the first telephone number 010-1111-1111 and the second number 010-2222-2222, respectively, provided from the SMS/MMS DB 252, according to the time sequence. The IM application 200 displays "IM" which is the transmission technique selected in FIG. 4A in a transmission technique informing unit 403 informing of the transmission technique. When a transmission 402 is selected after the user writes a message in an input section 401 of the combined message display window, the IM application 200 transmits the message written in the input section 401 to the interlocutor AAA through the IM transmission module 201.

In FIGS. 3, 4A, and 4B, when the second contact information among the plurality of contact information includes a plurality of telephone numbers, the SMS/MMS messages corresponding to the plurality of telephone numbers are provided and displayed in the combined message display window of the interlocutor. However, only an SMS/MMS message received and/or transmitted through a predetermined telephone number or a telephone number selected by the user among the plurality of telephone numbers may be displayed in the combined message display window.

Figure 5:
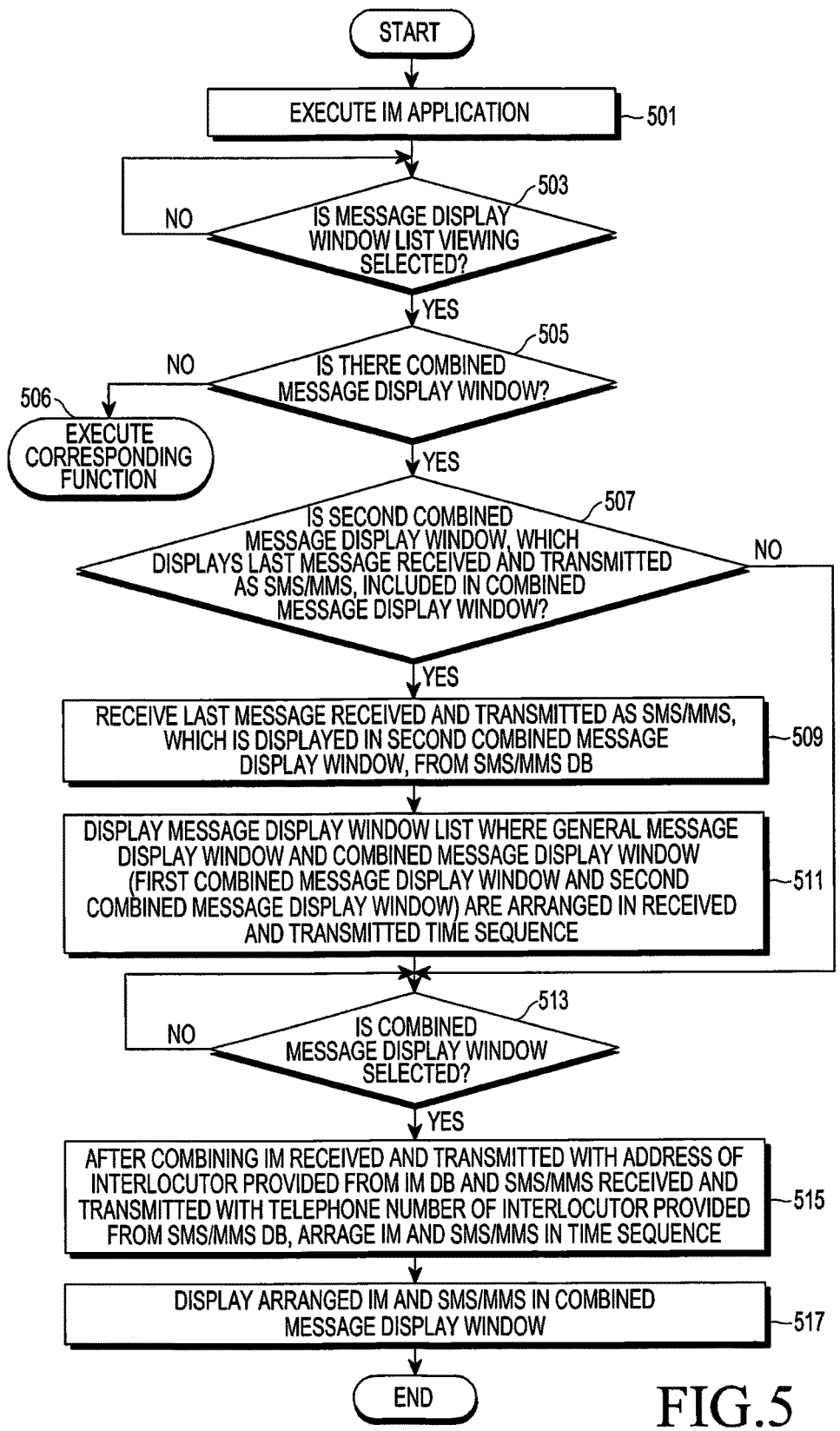
FIG. 5 is a diagram illustrating a message processing operation in an electronic device, according to an embodiment of the present invention.
Figure 6A:
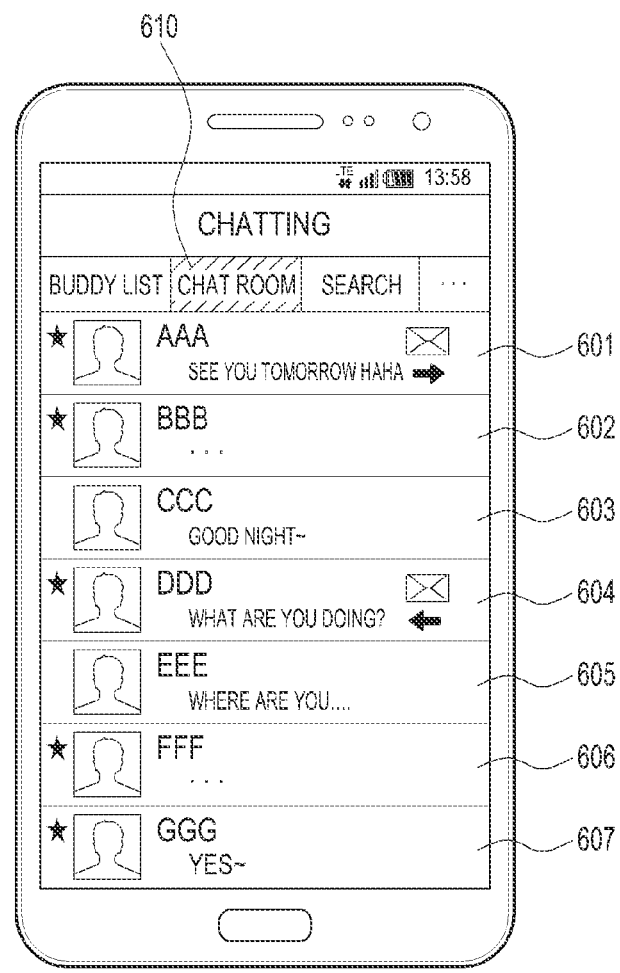
FIGS. 6A and 6B are diagrams illustrating the message processing operation in the electronic device, according to an embodiment of the present invention.
Figure 6B:
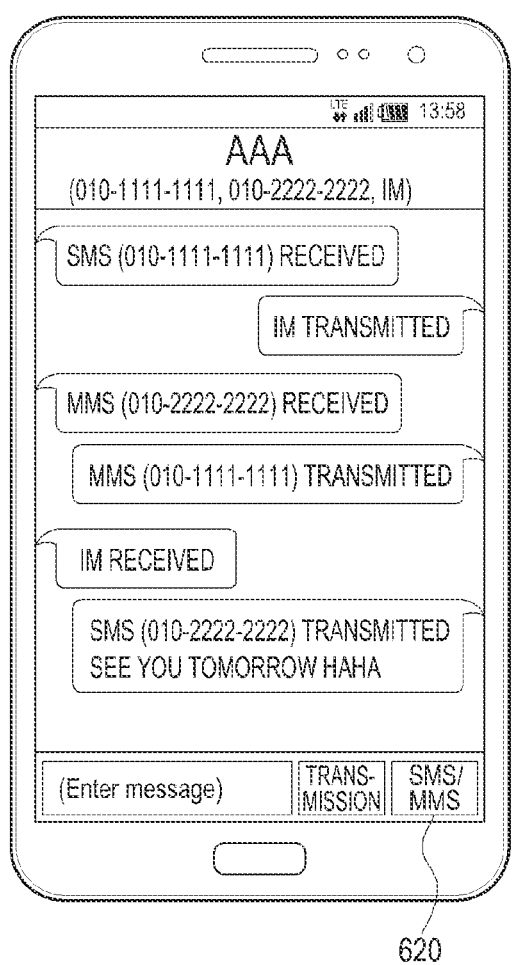

FIG. 5 is a diagram illustrating a message processing operation in an electronic device, according to an embodiment of the present invention. FIGS. 6A and 6B are diagrams illustrating the message processing operation in the electronic device, according to the embodiment of the present invention illustrated in FIG. 5.

Referring to FIG. 5, the IM application is executed, in step 501. In step 503, it is determined whether message display window list viewing is selected by the user. When the message display window list (e.g., a chat room list) viewing is selected, the IM application 200 determines whether the combined message display window is included in the message display window list, in step 505. When the combined message display window is not included, a corresponding function is executed, in step 506. When the combined message display window is included in the message display window list, the IM application 200 determines whether a second combined message display window, in which the last SMS/MMS message is displayed, is included in the combined message display window, in step 507. When the second combined message window is not included, the IM application 200 proceeds to step 513, as described in greater detail below.

When the second combined message window is included, the IM application requests and receives the last received and/or transmitted SMS/MMS message with the second contact information (i.e., at least one telephone number) of the interlocutor from the SMS/MMS DB 252, in step 509. The IM application 200 displays the message display window list including the general message display window and the combined message display window, in step 511. The general message display window includes only the first contact information (i.e., the IM address information) in the contact information of the interlocutor, and the combined message display window includes the first contact information (i.e., the IM address information) and the second contact information (i.e., at least one telephone number) in the contact information of the interlocutor.

The second combined message display window displays the last received and/or transmitted SMS/MMS message. The IM application 200 displays the last received and/or transmitted IM provided from the IM DB 202 in the general message display window and the first combined message display window, in step 511. In addition, the IM application 200 arranges and displays the general message display window and the combined message display window in the message display window list according to a received and transmitted time sequence, in step 511. The IM application 200 may separately display the general message display window and the combined message display window, in step 511. In addition, the IM application 200 may separately display the first combined message display window and the second combined message display window, in step 511.

In step 513, it is determined whether the combined message display window is selected. When the combined message display window is selected, the IM application 200 displays the selected combined message display window, in step 515. The IM application 200 receives the previously received and/or transmitted IM with the first contact information (i.e., the IM address information) of the interlocutor displayed in the selected combined message display window, by requesting the previously received and/or transmitted IM from the IM DB 202. In addition, the IM application 200 receives the previously received and/or transmitted SMS/MMS message with the second contact information (i.e., the at least one telephone number) of the interlocutor displayed in the selected combined message display window, by requesting the previously received and/or transmitted SMS/MMS message from the SMS/MMS DB 252. Further, the IM application 200 arranges the IM provided from the IM DB 202 and the SMS/MMS message provided from the SMS/MMS DB 252 according to the received and transmitted time sequence after combining the IM and SMS/MMS messages, in step 515. The IM application 200 displays the arranged IM and SMS/MMS messages in the combined message display window, in step 517. The IM application 200 may separately display the IM and SMS/MMS messages.

Hereinafter, the operations of FIG. 5 are described with reference to FIGS. 6A and 6B. While the IM application is executed, when message display window list viewing (e.g., chat room) 610 is selected, the IM application 200 displays a message display window list including a plurality of message display windows 601 to 607, as shown in FIG. 6A. The IM application 200 displays the combined message display windows 601, 602, 604, 606 and 607 as distinguished from the general message display windows 603 and 605 by displaying an icon "*" in the combined message display windows 601, 602, 604, 606 and 607 in the message display window list. The interlocutor of the combined message display windows 601, 602, 604, 606 and 607 have the first contact information (i.e., the IM address information) and the second contact information (i.e., at least one telephone number), and the interlocutor of the general message display windows 603 and 605 has only the first contact information (i.e., the IM address information). In addition, the IM application 200 displays the second combined message display windows 601 and 604 as distinguished from the first combined message display windows 602, 606 and 607 by displaying an icon having a letter shape in the second combined message display windows 601 and 604 among the combined message display windows 601, 602, 604, 606 and 607 in the message display window list. The first combined message display windows display a last received and/or transmitted IM, and the second combined message display window displays a last received and/or transmitted SMS/MMS message. The IM application 200 displays content of the last transmitted SMS/MMS message provided from the SMS/MMS DB 252 in the second combined message display window 601 of the interlocutor AAA in the message display window list. In addition, the IM application 200 displays content of the last received SMS/MMS message provided from the SMS/MMS DB 252 in the second combined message display window 604 of the interlocutor DDD in the message display window list.

When the second combined message display window 601 of the interlocutor AAA is selected by the user from the message display window list, the IM application 200 arranges and displays the previously received and/or transmitted IM with the first contact information (i.e., the IM address information) of the interlocutor AAA and the previously received and/or transmitted SMS/MMS message with the second contact information (i.e. at least one of telephone numbers 010-111-1111 and 010-222-2222) of the interlocutor AAA in the combined message display window according to the time sequence, as shown in FIG. 6B. The IM application 200 displays content of the last transmitted SMS/MMS message in the combined message display window, as shown in FIG. 6B. In addition, the IM application 200 displays a current transmission technique by displaying "SMS/MMS", which is the last used transmission technique, in a transmission technique informing section 620, which informs of the transmission technique.

Figure 7:
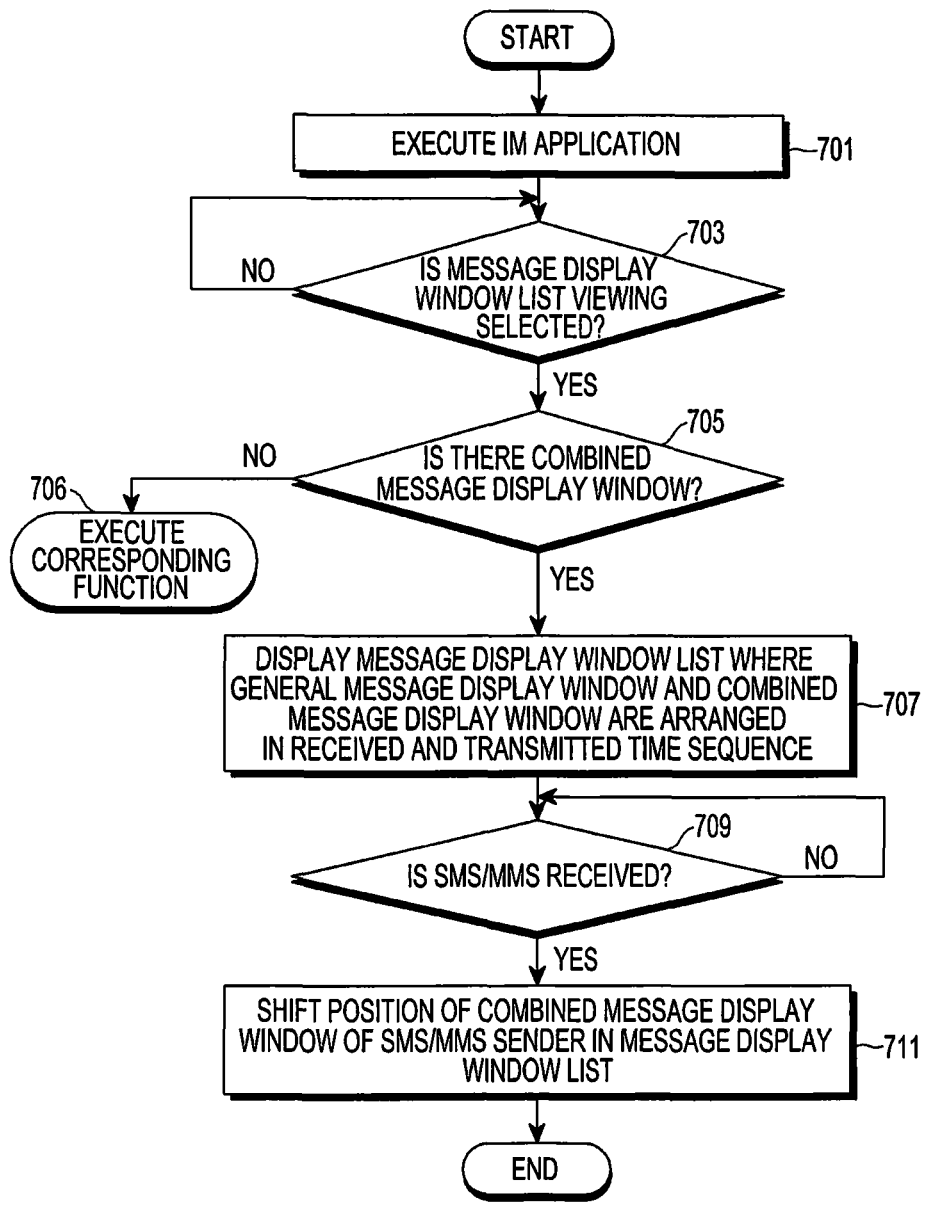
FIG. 7 is a diagram illustrating a message processing operation in an electronic device, according to an embodiment of the present invention.
Figure 8:
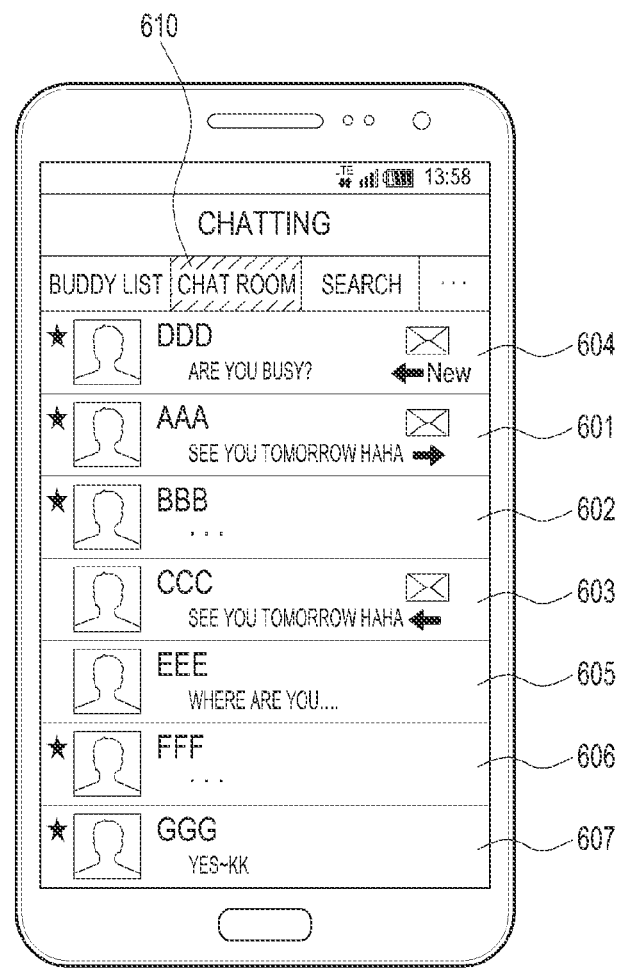
FIG. 8 is a diagram illustrating a message processing operation in an electronic device, according to an embodiment of the present invention.

FIG. 7 is a diagram illustrating a message processing operation in an electronic device, according to an embodiment of the present invention. FIG. 8 is a diagram illustrating the message processing operation in the electronic device, according to the embodiment of the present invention illustrated in FIG. 7.

Referring to FIG. 7, the IM application is executed, in step 701. In step 703, it is determined whether a message display window list viewing (e.g., chat room) is selected. When the message display window list viewing is selected by the user, the IM application 200 determines whether the combined message display window is included in the message display window list, in step 705. When the combined message display window is not included, a corresponding function is executed, in step 706. When the IM application 200 determines that the combined message display window in which the interlocutor has the first contact information (i.e., the IM address information) and the second contact information (i.e., at least one telephone number) is included in the message display window list, the IM application 200 displays the message display window list in which the general message display window having only the first contact information (i.e., the IM address information) of the interlocutor and the combined message window having the first contact information and the second contact information are arranged according to the time sequence, in step 707. While the message display window list is displayed, it is determined whether an SMS/MMS message is received in step 709. When the SMS/MMS message is received through the SMS/MMS transmission module 251 and stored in the SMS/MMS DB 252, the IM application continuously monitoring the SMS/MMS DB 252 requests and receives the SMS/MMS message from the SMS/MMS DB 252. When the new SMS/MMS message is received from the SMS/MMS DB 252, the IM application 200 determines a position of the combined message display window corresponding to a sender of the newly received SMS/MMS message in the message display window list. The IM application 200 shifts the position of the determined combined message display window to the top or the bottom of the message display window list and displays the combined message display window, in step 711. Alternatively, when the combined message corresponding to the sender of the newly received SMS/MMS message is not included in the message display window list, the IM application 200 generates a new combined message display window, shifts the newly generated combined message display window to the top or the bottom of the message display window list, and displays the newly generated combined message display window.

Hereinafter, the operations of the FIG. 7 are described with reference to FIG. 8. The IM application is executed and the message display window list, including the general message display window and the combined message display window, is displayed as shown in FIG. 6A. When the new SMS/MMS message is received from the interlocutor DDD, the IM application shifts the combined message display window 604 of the interlocutor DDD to the top of the message display window list, and displays the combined message display window 604.

Figure 9:
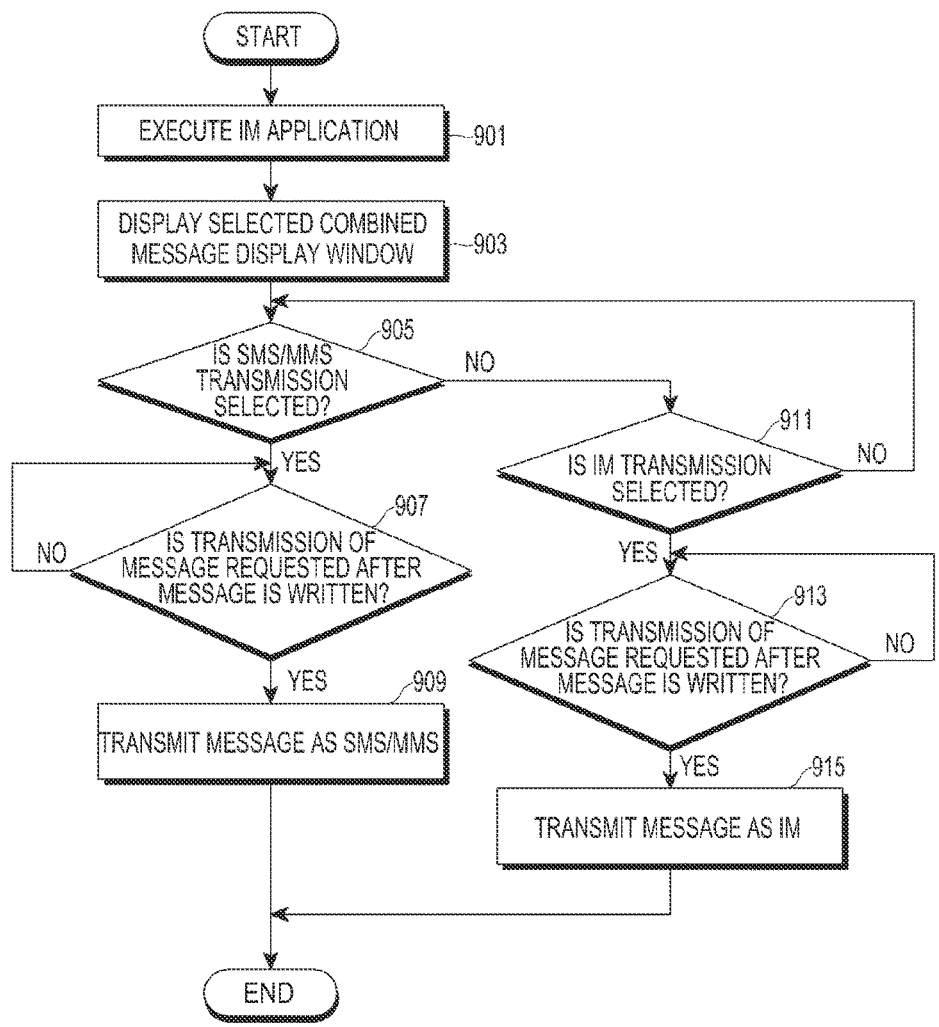
FIG. 9 is a diagram illustrating a message processing operation in an electronic device, according to an embodiment of the present invention.

FIG. 9 is a diagram illustrating a message processing operation in an electronic device, according to an embodiment of the present invention. FIGS. 10A, 10B, 11A and 11B are diagrams illustrating describing the message processing operation in the electronic device, according to the embodiment of the present invention illustrated in FIG. 9.

Referring to FIG. 9, the IM application is executed, in step 901. The IM application 200 displays the combined message display window of the interlocutor selected from among the plurality of contact information (i.e., the buddy list) or the combined message display window selected from among the message display window list (i.e., the chat room), in step 903.

While the combined message display window is displayed, it is determined whether the SMS/MMS transmission technique is selected through the combined message display window in step 905. When the transmission technique of the SMS/MMS is selected, the IM application may change the message transmission technique to the SMS/MMS. After the message transmission technique is changed and set to the SMS/MMS, it is determined whether transmission of a written message is requested, in step 907. When the transmission of the written message is requested, the IM application displays the written message in the combined message display window, simultaneously transmits the written message to the SMS/MMS DB 252 for storage, and transmits the written message to the SMS/MMS transmission module 251 for transmission as an SMS/MMS message, in step 909.

When the transmission technique of the SMS/MMS is not selected, it is determined whether the transmission technique of the IM is selected through the combined message display window, in step 911. When the transmission technique of the IM is selected, the IM application may change the message transmission technique to the IM. After the message transmission technique is changed and set to the IM, it is determined whether transmission of a written message is requested, in step 913. When the transmission of the written message is requested, the IM application displays the written message in the combined message display window, simultaneously transmits the written message to the IM DB 202 for storage, and transmits the written message to the IM transmission module 201 for transmission as an IM, in step 915.

The user may freely select a desirable transmission technique for the message in the combined message display window, as described above, to transmit the message.

Figure 10A:
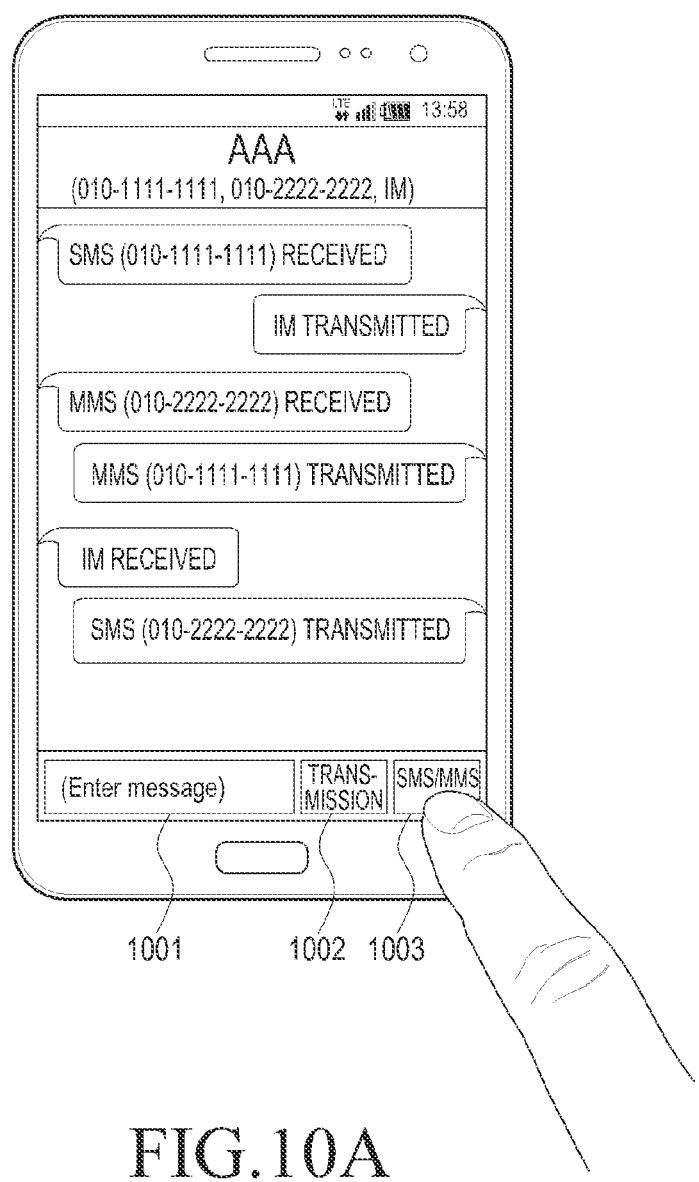
FIGS. 10A, 10B, 11A, and 11B are diagrams illustrating the message processing operation in the electronic device, according to an embodiment of the present invention.
Figure 10B:
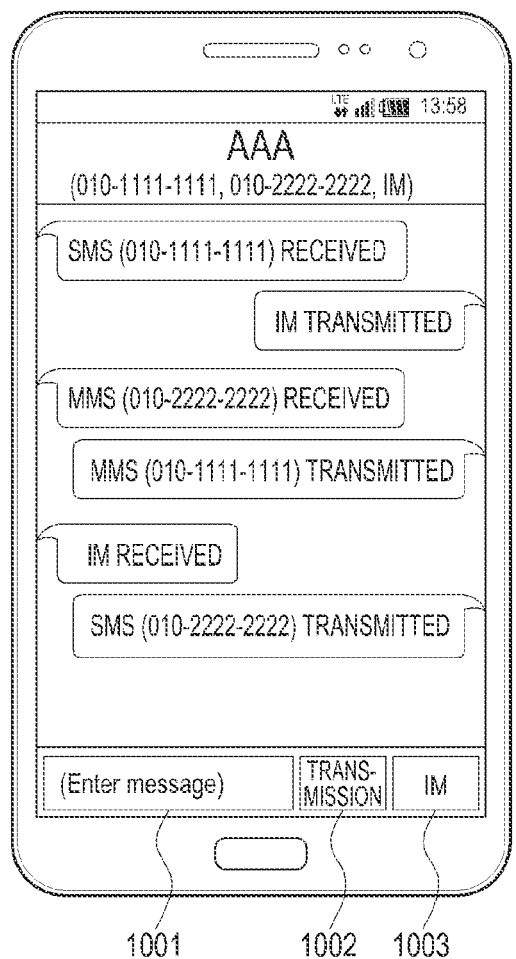

Hereinafter, the operations of the FIG. 9 are described with reference to FIGS. 10A, 10B, 11A, and 11B. Firstly, referring to FIGS. 10A and 10B, when the interlocutor AAA is selected while the IM application is executed, the IM application 200 displays the combined message display window of the interlocutor AAA, as shown in FIG. 10A. In the combined message display window of the interlocutor AAA, the last transmitted SMS/MMS message is displayed, and thus, an informing section 1003 informing of the current transmission technique displays the SMS/MMS. In FIG. 10A, when the informing section 1003 displaying the SMS/MMS is selected by the user, the IM application 200 informs that the current transmission technique is changed to IM by displaying IM instead of SMS/MMS in the informing section 1003, as shown in FIG. 10B. When the informing section 1003 displaying IM as shown in FIG. 10B is selected again by the user, the IM application 200 informs that the current transmission technique is changed to SMS/MMS by displaying SMS/MMS instead of IM in the informing section 1003, as shown in FIG. 10A. A written message is provided in message section 1001, and transmission of the written message is enabled when a user selects transmission section 1002.

Figure 11A:
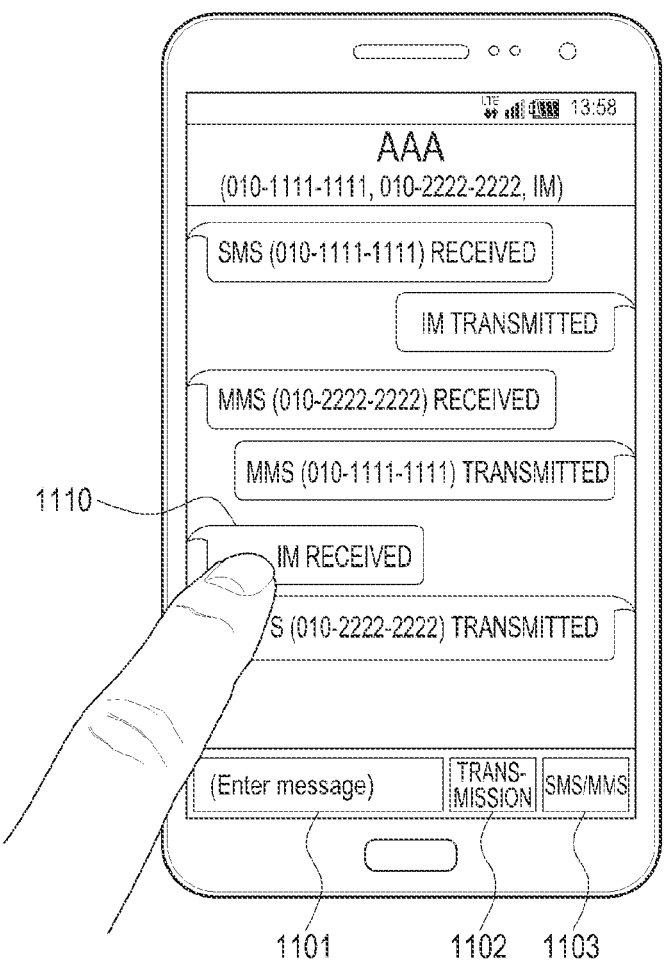
Figure 11B:
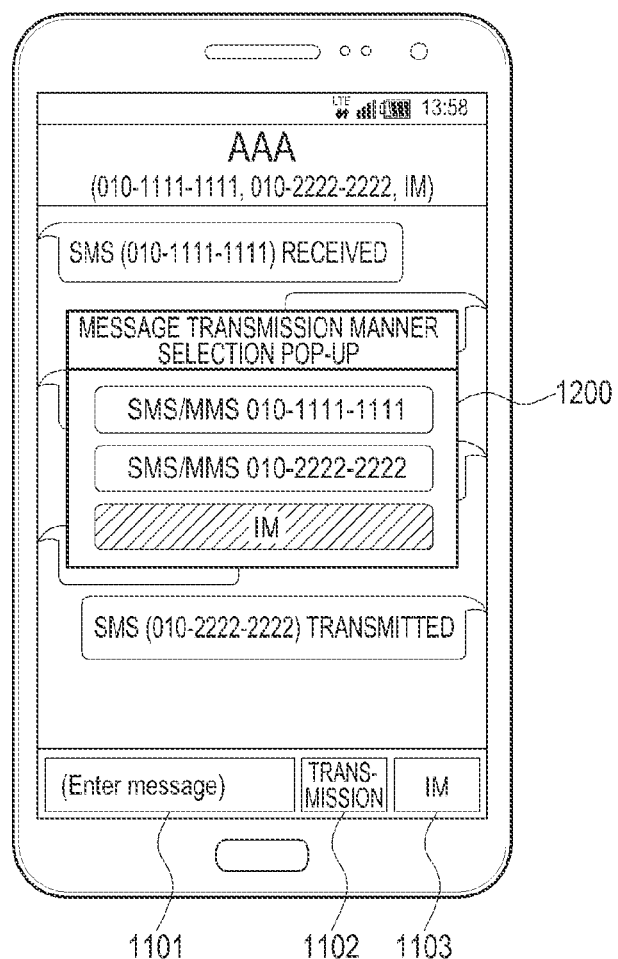

Referring to FIGS. 11A and 11B, when the interlocutor AAA is selected while the IM application is executed, the IM application 200 displays the combined message display window of the interlocutor AAA, as shown in FIG. 11A. In the combined message display window of the interlocutor AAA, the last transmitted SMS/MMS message is displayed, and thus, an informing section 1103 informing of the current transmission technique displays SMS/MMS. When a previously received and/or transmitted IM or SMS message is selected in the combined message display window of the interlocutor AAA, the IM application 200 displays the types of message transmission techniques that correspond to the contact information of the interlocutor AAA. As shown in FIG. 11A, a touch 1100 is input to a previously received and/or transmitted IM in the combined message display window of the interlocutor AAA. The IM application 200 displays a pop-up window 1200 that includes types of message transmission techniques corresponding to the contact information, i.e., 010-111-1111, 010-222-2222 and AAA@xxx.com, of the interlocutor AAA. When the IM is selected from the pop-up window 1200, the IM application 200 informs that the current transmission manner is changed from SMS/MMS to IM by changing SMS/MMS to IM in the informing section 1103 of the combined message display window. A written message is provided in message section 1101, and transmission of the written message is enabled when a user selects transmission section 1102.

Figure 12:
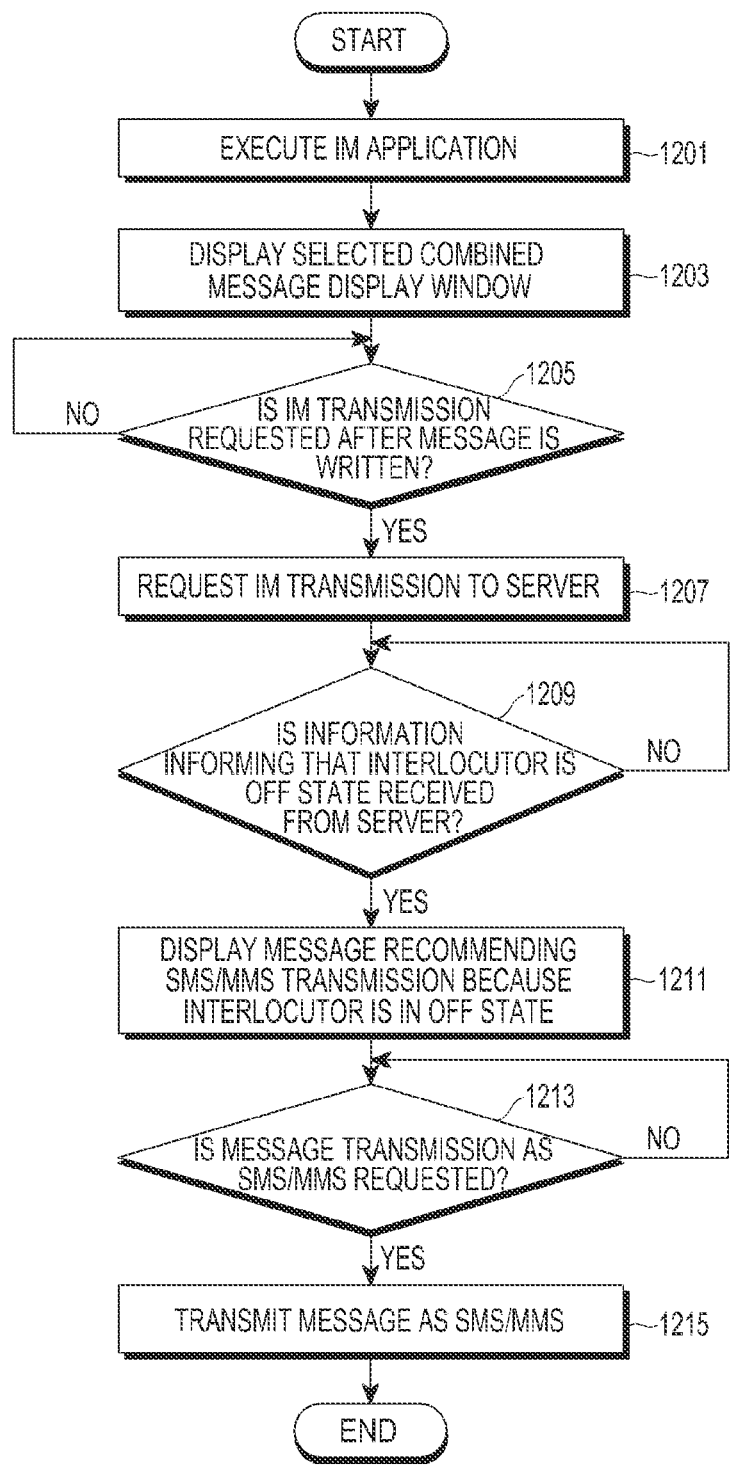
FIG. 12 is a diagram illustrating a message processing operation in an electronic device, according to an embodiment of the present invention.

FIG. 12 is a diagram illustrating a message processing operation in an electronic device, according to an embodiment of the present invention.

Referring to FIG. 12, the IM application is executed, in step 1201. The IM application 200 displays the combined message display window of the interlocutor selected from among the plurality of contact information (i.e., the buddy list) or the combined message display window selected from among the message display window list (i.e., the chat room), in step 1203.

In step 1205, it is determined whether a written message is requested to be transmitted as an IM. When the written message is requested to be transmitted as an IM, the IM application 200 transmits the IM to the server through the IM transmission module 201, in step 1207. In step 1209, it is determined whether information is received from the server indicating that the interlocutor is in an off state. When the information is received, the IM application 200 displays a message recommending that the written message be transmitted as an SMS/MMS message since the IM transmission is impossible, in step 1211. In step 1213, it is determined whether the written message is requested to be transmitted as an SMS/MMS message. When the written message is requested to be transmitted as an SMS/MMS message, the IM application transmits the message to the SMS/MMS DB 252 to store the message in the SMS/MMS DB 252, and transmits the written message as an SMS/MMS message through the SMS/MMS module 251, in step 1215.

Figure 13:
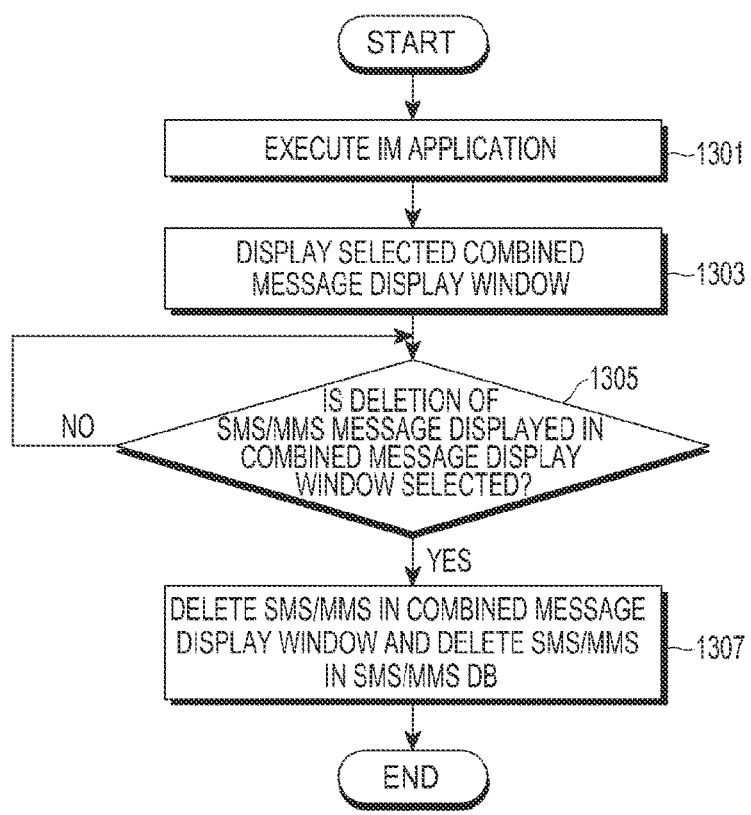
FIG. 13 is a diagram illustrating a message processing operation in an electronic device, according to an embodiment of the present invention.

FIG. 13 is a diagram illustrating a message processing operation in an electronic device, according to an embodiment of the present invention.

Referring to FIG. 13, the IM application is executed, in step 1301. The IM application 200 displays the combined message display window of the interlocutor selected from among the plurality of contact information (i.e. the buddy list) or the combined message display window selected from among the message display window list (i.e. the chat room), in step 1303.

The IM application 200 determines whether the IM application 200 deletes a specific SMS/MMS message in the combined message display window, in step 1305. In the combined message display window, the previously received and/or transmitted IM provided from the IM DB 202 and the previously received and/or transmitted SMS/MMS message provided from the SMS/MMS DB 252 are arranged and displayed according to the time sequence. When the deletion of the specific SMS/MMS message displayed in the combined message display window is selected, the IM application 200 deletes the specific SMS/MMS message, in step 1307. The IM application 200 deletes the specific SMS/MMS message by requesting the deletion of the specific SMS/MMS message to the SMS/MMS DB 252.

The described component elements of an electronic device, according to an embodiment of the present invention, may be formed of one or more components, and a name of a corresponding component element may be changed based on a type of electronic device. An electronic device, according to an embodiment of the present invention, may be formed to include at least one of the described component elements, and a few component elements may be omitted or additional component elements may be further included. Also, some of the components of the electronic device, according to an embodiment of the present invention, may be combined to form a single entity, and thus, may execute functions equivalent to the corresponding components before being combined.

The term "module", as used in various embodiments of the present invention, may refer to, for example, a "unit" including one of hardware, software, and firmware, or a combination of two or more of the hardware, software, and firmware. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module", according to an embodiment of the present invention, may include at least one of an Application-Specific Integrated Circuit (ASIC) chip, a Field-Programmable Gate Arrays (FPGAs), and a programmable-logic device for performing operations.

According to an embodiment of the present invention, at least part of a device (for example, modules or functions thereof) or a method (for example, operations) may be embodied by, for example, an instruction stored in a computer readable storage medium provided in a form of a programming module. When a command is executed by one or more processors (for example, the processor 120), the one or more processors may execute a function corresponding to the command. The computer-readable storage medium may be, for example, the memory 130. At least a part of the programming module may be implemented (for example, executed) by, for example, the processor 120. At least a part of the programming module may include, for example, a module, a program, a routine, a set of instructions and/or a process for performing one or more functions.

The computer-readable recording medium may include magnetic media such as, for example, a hard disk, a floppy disk, and a magnetic tape, optical media such as, for example, a Compact Disc Read Only Memory (CD-ROM) and a Digital Versatile Disc (DVD), magneto-optical media such as, for example, a floptical disk, and hardware devices specially configured to store and perform a program instruction (for example, programming module), such as, for example, a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A programming module, according to an embodiment of the present invention, may include at least one of the described component elements, a few of the component elements may be omitted, or additional component elements may be included. Operations executed by a module, a programming module, or other component elements, according to an embodiment of the present invention, may be executed sequentially, in parallel, repeatedly, or in a heuristic manner. Further, some operations may be executed according to another order or may be omitted, or other operations may be added.

According to an embodiment of the present invention, in a storage-medium storing instructions, the instructions are set to enable at least one processor to perform at least one operation when the instructions are executed by the at least one processor. The at least one operation may include executing a first message application, which displays a first message and a second message, received and/or transmitted through the first message application and a second message application, in a combined message display window of an interlocutor, and executing a second message application that provides the second message to the first message application while the first message application is executed, in an electronic device (e.g., the electronic device 101).

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
a memory; and
a processor coupled to the memory and configured to execute a first message application, which displays a first message and a second message in a combined message display window of an interlocutor, and execute a second message application, which provides the second message to the first message application while the first message application is executed,
wherein the first message is received and/or transmitted through the first message application, and the second message is received and/or transmitted through the second message application, and
wherein the first message application and the second message application have different message reception and transmission techniques.

2. The electronic device of claim 1, wherein:
the processor is further configured to control the first message application to store the first message, request a provision of the second message to the second message application, and store a plurality of interlocutors, each of the plurality of interlocutors having a plurality of contact information including first contact information for at least one of receiving and transmitting the first message and second contact information for at least one of receiving and transmitting the second message, and
the processor is further configured to control the second message application to store the second message, and provides the second message to the first message application according to the request of the first message application.

3. The electronic device of claim 1, wherein:
the processor is further configured to control the first message application to detect the first message received and/or transmitted with first contact information from among a plurality of contact information of the interlocutor, receive, from the second application, the second message received and/or transmitted with second contact information from among the plurality of contact information of the interlocutor, and display the first message and the second message in the combined message display window of the interlocutor according to a time sequence, and the plurality of contact information of the interlocutor includes at least one of address information, at least one telephone number, and an email address.

4. The electronic device of claim 1, wherein, when the interlocutor is selected, the processor is further configured to control the first message application to detect a previous first message received and/or transmitted with first contact information from among a plurality of contact information of the interlocutor, receive, from the second message application, a previous second message received and/or transmitted with second contact information from among the plurality of contact information, arrange the previous first message and the previous second message according to a time sequence, and display the arranged previous first message and previous second message in the combined message display window of the interlocutor.

5. The electronic device of claim 4, wherein the processor is further configured to control the first message application to display a plurality of message transmission techniques, and when a message transmission technique is selected from among the plurality of message transmission techniques, set the selected message transmission technique for the combined message display window of the interlocutor and display the selected message transmission technique in the combined message display window of the interlocutor.

6. The electronic device of claim 1, wherein:
when message display window list viewing is selected, the processor is further configured to control the first message application to arrange a message display window list including at least one of a general message display window and the combined message display window according to a time sequence and display the message display window list, and
when there are first and second combined message display windows, the first message application receives a last received and/or transmitted second message from the second message application and displays the last received and transmitted second message.

7. The electronic device of claim 6, wherein the processor is further configured to control the first message application to:
display the general message display window with only first contact information for receiving and/or transmitting the first message and display the combined message display window with the first contact information and second contact information for receiving and/or transmitting the second message, in the message display window list, and
display a first combined message display window with a last received and/or transmitted first message and display a second combined message display window with a last received and/or transmitted second message.

8. The electronic device of claim 6, wherein, when the combined message display window is selected in the message display window list, the processor is further configured to control the first message application to identify a plurality of contact information of the interlocutor corresponding to the selected combined message display window, detect a previous first message received and/or transmitted with first contact information from among the plurality of contact information, receive, from the second message application, a previous second message received and/or transmitted with second contact information from among the plurality of contact information, arrange the previous first message and the previous second message according to a time sequence, and display the arranged previous first message and previous second message in the combined message display window of the interlocutor.

9. The electronic device of claim 6, wherein, when a new second message is received while the message display window list is displayed, the processor is further configured to control the first message application to change a position of the combined message display window corresponding to a sender of the new second message, and display the combined message display window corresponding to the sender of the new second message in the message display window list.

10. The electronic device of claim 1, wherein, when a first transmission technique of the first message application is selected, the processor is further configured to control the first message application to transmit a written message as the first message, and when a second transmission technique of the second message application is selected, the processor is further configured to control the first message application to transmit the written message as the second message, while the combined message display window is displayed.

11. The electronic device of claim 10, wherein, while transmitting the first message or the second message through the combined message display window, the processor is further configured to control the first message application to display the first message or the second message.

12. The electronic device of claim 1, wherein, while the combined message display window is displayed, and when information is received from a server informing that the interlocutor may not receive a message in a first transmission technique of the first message application in response to transmission of a written message to the interlocutor by the first message application, the processor is further configured to control the first message application to inform of an impossibility of the transmission of the first message and display a message recommending a transmission of the written message using a second transmission technique of the second message application.

13. The electronic device of claim 1, wherein, when a deletion of the second message is selected, the processor is further configured to control the first message application to request the second message application to delete the second message.

14. The electronic device of claim 1, wherein the first message application includes an Instant Message (IM) application, and the second message application includes a Short Message Service/Multimedia Messaging Service (SMS/MMS) application.

15. A method of processing a message in an electronic device, the method comprising:
    displaying a first message and a second message in a combined message display window of an interlocutor, via an execution of a first message application; and
    providing the second message to the first message application while the first message application is executed, via an execution of a second message application,
    wherein the first message is received and/or transmitted through the first message application, and the second message is received and/or transmitted through the second message application, and
    wherein the first message application and the second message application have different message reception and transmission techniques.

16. The method of claim 15, wherein:
    the first message application stores the first message, requests a provision of the second message to the second message application, and stores a plurality of interlocutors, each of the plurality of interlocutors having a plurality of contact information including first contact information for at least one of receiving and transmitting the first message and second contact information for at least one of receiving and transmitting the second message, and
    the second message application stores the second message, and provides the second message to the first message application according to the request of the first message application.

17. The method of claim 15, wherein displaying the first message and the second message in the combined message display window comprises:
    detecting the first message received and/or transmitted with first contact information from among a plurality of contact information of the interlocutor, by the first message application,
    receiving the second message received and/or transmitted with second contact information from among the plurality of contact information of the interlocutor from the second message application, by the first message application; and
    displaying the first message and the second message in the combined message display window of the interlocutor according to a time sequence, by the first message application,
    wherein the plurality of contact information of the interlocutor includes at least one of address information, at least one telephone number and an email address.

18. The method of claim 15, further comprising:
    detecting a previous first message received and/or transmitted with first contact information from among a plurality of contact information of the interlocutor, by the first message application, when the interlocutor is selected;
    receiving, from the second message application, a previous second message received and/or transmitted with second contact information from among the plurality of contact information, by the first message application; and
    arranging the previous first message and the previous second message, and displaying the arranged previous first message and previous second message in the combined message display window of the interlocutor, by the first message application.

19. The method of claim 18, further comprising:
    displaying a plurality of message transmission techniques by the first message application; and
    setting a message transmission technique for the combined message display window of the interlocutor and displaying the message transmission technique in the combined message display window of the interlocutor, by the first message application, when the message transmission technique is selected from among the plurality of message transmission techniques.

20. The method of claim 15, further comprising:
    arranging a message display window list, including at least one of a general message display window and the combined message display window, according to a time sequence, and displaying the message display window list, by the first message application, when message display window list viewing is selected; and
    receiving a last received and/or transmitted second message from the second message application and displaying the last received and/or transmitted second message in a first or second combined message display window, by the first message application, when there are the first and second combined message display windows.

21. The method of claim 20, wherein the general message display window displays only first contact information for receiving and/or transmitting the first message, the combined message display window displays the first contact information and second contact information for receiving and/or transmitting the second message, a first combined message display window displays a last received and/or transmitted first message, and a second combined message display window displays a last received and/or transmitted second message.

22. The method of claim 20, further comprising:
identifying a plurality of contact information of the interlocutor corresponding to a selected combined message display window, by the first message application, when the combined message display window is selected in the message display window list;
detecting a previous first message received and/or transmitted with first contact information from among the plurality of contact information and receiving a previous second message received and/or transmitted with second contact information from among the plurality of contact information, by the first message application; and
arranging the previous first message and the previous second message according to a time sequence, and displaying the arranged previous first message and previous second message in the combined message display window of the interlocutor, by the first message application.

23. The method of claim 22, further comprising:
changing a position of the combined message display window corresponding to a sender of a new second message and displaying the combined message display window corresponding to the sender of the new second message in the message display window list, by the first message application, when the new second message is received while the message display window list is displayed.

24. The method of claim 15, further comprising:
transmitting a written message as the first message, when a first transmission technique of the first message application is selected, and transmitting the written message as the second message, when a second transmission manner of the second message application is selected, by the first message application, while the combined message display window is displayed.

25. The method of claim 24, further comprising:
displaying the first message or the second message, by the first message application, while transmitting the first message or the second message through the combined message display window.

26. The method of claim 15, further comprising:
informing of an impossibility of a transmission of the first message and displaying a message recommending a transmission of a written message using a second message transmission technique of the second message application, by the first message application, when information is received from a server informing that the interlocutor may not receive the written message in response to the transmission of the written message to the interlocutor in a first message transmission technique of the first message application, while the combined message display window is displayed.

27. The method of claim 15, further comprising:
requesting that the second message application delete the selected second message, by the first message application, when deletion of the second message, which is displayed in the combined message display window, is selected.

28. The method of claim 15, wherein the first message application includes an Instant Message (IM) application, and the second message application includes a Short Message Service/Multimedia Messaging Service (SMS/MMS) application.

29. An article of manufacture for processing a message in an electronic device, comprising a non-transitory machine readable medium containing one or more programs which when executed implement the steps of:
displaying a first message and a second message in a combined message display window of an interlocutor, via a first message application; and
providing the second message to the first message application while the first message application is executed, via a second message application,
wherein the first message is received and/or transmitted through the first message application, and the second message is received and/or transmitted through the second message application, and
wherein the first message application and the second message application have different message reception and transmission techniques.

* * * * *